Figure 1:
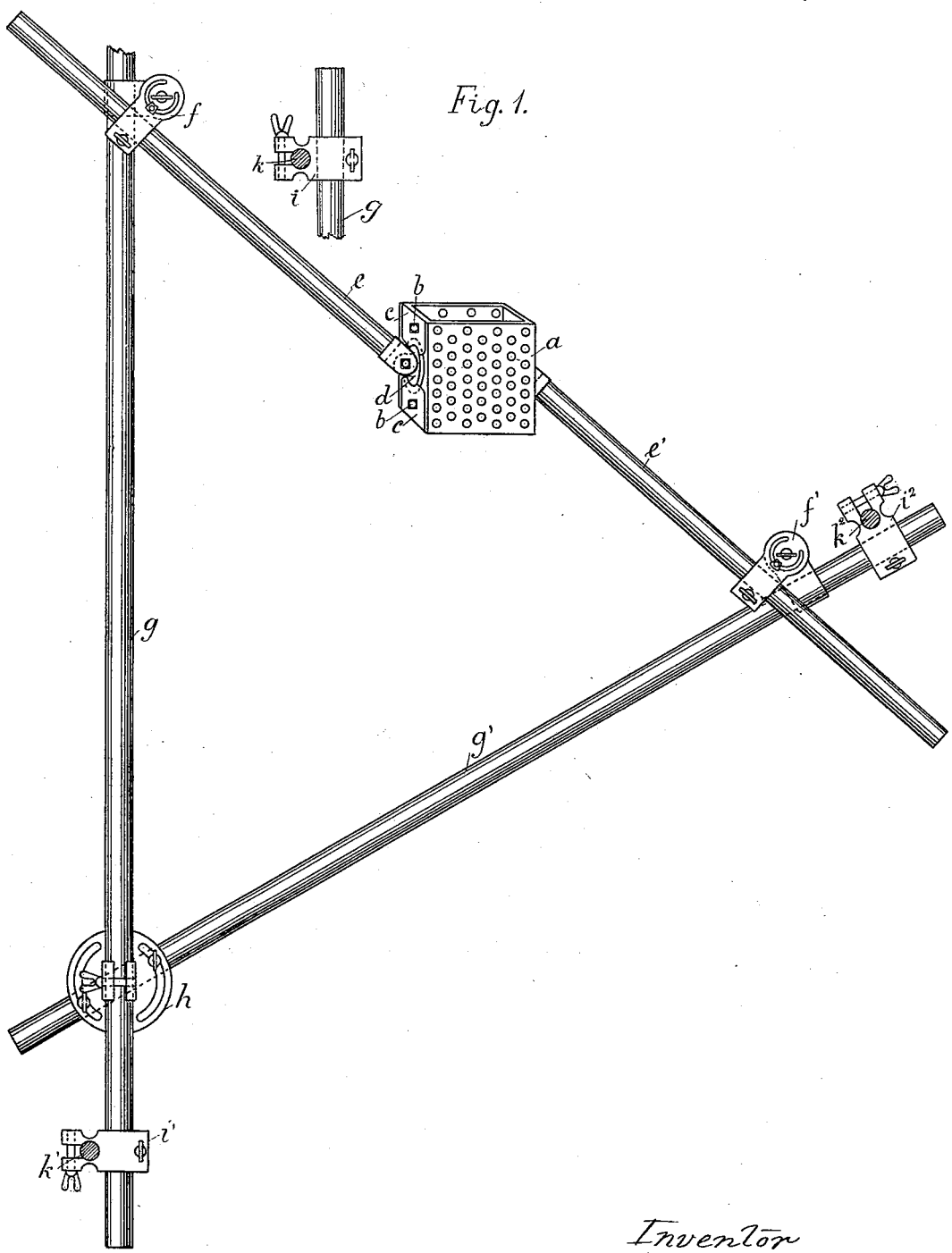

(No Model.)
2 Sheets—Sheet 1.

P. HASSELBERG.
APPARATUS FOR COPYING SCULPTURAL WORK.

No. 508,310.
Patented Nov. 7, 1893.

Witnesses.
Inventor
Pehr Hasselberg.
By his Atty's
John J. Halsted & Son

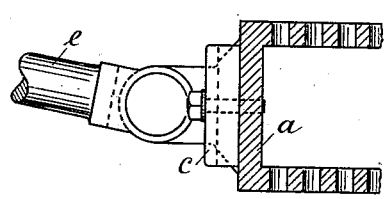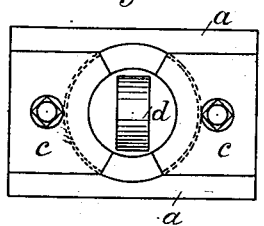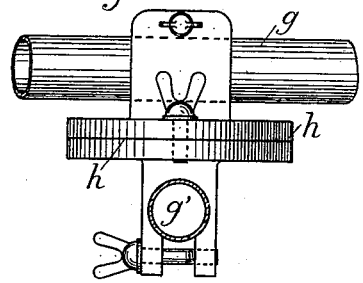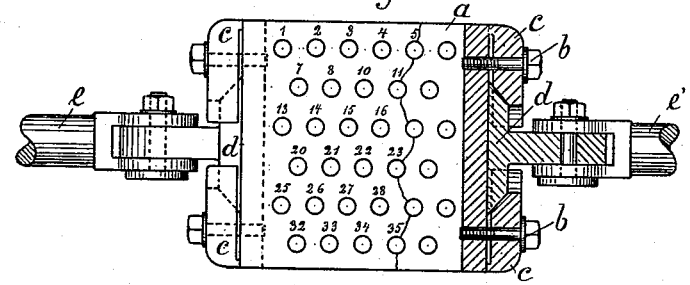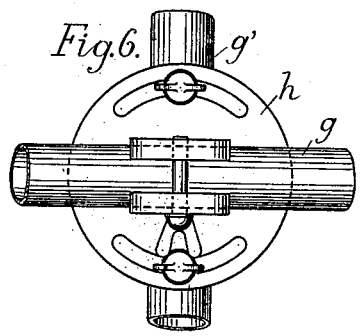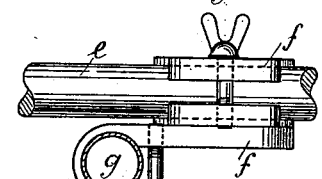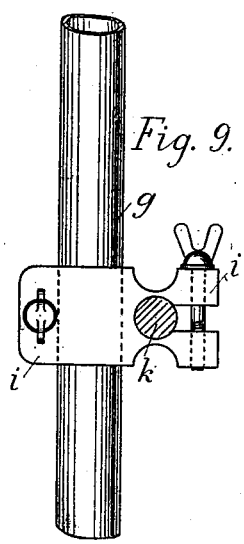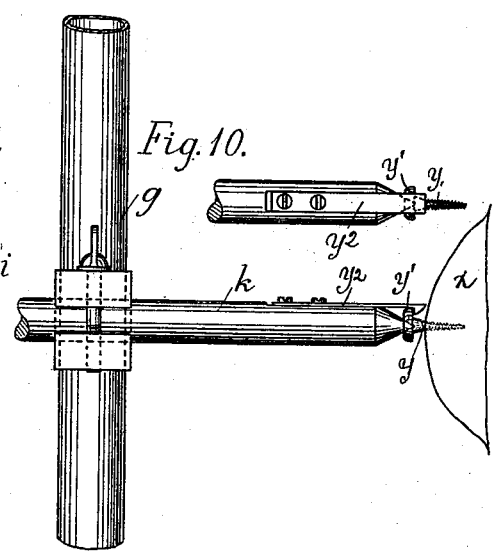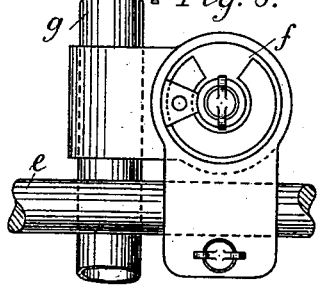

UNITED STATES PATENT OFFICE.

PEHR HASSELBERG, OF STOCKHOLM, SWEDEN.

APPARATUS FOR COPYING SCULPTURAL WORK.

SPECIFICATION forming part of Letters Patent No. 508,310, dated November 7, 1893.

Application filed April 15, 1893. Serial No. 470,545. (No model.)

*To all whom it may concern:*

Be it known that I, PEHR HASSELBERG, a subject of the King of Sweden and Norway, residing at Stockholm, Sweden, have invented certain new and useful Improvements in Apparatus for Copying Sculptural Works; and I do hereby declare that the following is a full, clear, and exact description of the invention, which will enable others skilled in the art to which it appertains to make and use the same, reference being had to the accompanying drawings, and to letters of reference marked thereon, which form a part of this specification.

My invention has for its object an improved apparatus for copying sculptural works by means of puncturing or boring into the material out of which the copy is to be formed. By the employment of this apparatus this puncturing is highly facilitated so that it can be performed in much shorter time than is the case with apparatus for the same purpose hitherto known to me.

The apparatus is shown in the accompanying drawings.

Figure 1 is a plan view of the whole apparatus, the end of rod $g$ at the upper end of the drawing being broken off, and shown detached and Figs. 2 to 10 are details on a larger scale, Fig. 2. showing part of a section through the cube-shaped holder; Fig. 3. a plan view of the left hand side of said holder shown in Fig. 1; Fig. 4. an enlarged view of the holder partly in section, the better to show its construction and its connection with the jointed rods; Fig. 5. a plan of one of the clamps $h$. and of its means for connecting the rods thereto; Fig. 6. an elevation of the same; Fig. 7. an edge view of one of the clamps $f$, and of parts connected thereto; Fig. 8. a plan of the same; Fig. 9. a plan, and Fig. 10. a side view showing one of the nails $k$, $k'$ or $k^2$. and its means for adjustment.

$a$, Figs. 1. to 4. is a cube-shaped holder, the upper and lower sides of which have a great number of holes placed one above the other, in which holes the piercers that are to be used for puncturing are inserted and guided. On two opposite sides of the cube there are taps $d$, fastened to the sides by means of clamp-plates $c$, which by tightening the screws $b$ are pressed against the foot-flanges of the taps. The taps $d$ are movably jointed to the forked ends of two rods $e$ $e'$, the free ends of which are inserted in clamps $f$ $f'$. These clamps $f$, $f'$, (Figs. 7. and 8.) are made in two parts pivoted to each other, and each consisting of a cap with set-screw. In the upper caps, as before stated, the rods $e$ are inserted, while the lower clamps clasp around the ends of two other rods $g$ $g'$.

In consequence of the movability of the aforesaid connections, the rods $g$, $g'$ and the rods $e$, $e'$ with the cube $a$ linked between them can be adjusted to form a triangular frame, as shown in Fig. 1, with their ends projecting outside the crossing points. The rods $g$, $g'$, are fastened to each other in the crossing point; their ends being inserted in the clamp-caps of a clamp $h$ made in two parts pivoted to each other.

In consequence of the above described arrangement now pointed out, all the rods can be turned and shifted one in relation to the other, when the set-screws are loosened; but when these screws are secured, the rods are jointed to and constitute an inflexible or rigid whole. On both of the free ends of the rod $g$, and on the one end of the rod $g'$, three vertically adjustable nails $k$, $k'$ $k^2$ are also fixed by clamp-caps as shown in Figs. 1, 9 and 10.

The employment of the apparatus is as follows: If the model that is to be copied be small, compared with the apparatus, three fixed points or pieces $x$. made of small plaster-blocks with metal "trunnels" or pegs $y$ molded in them (see Fig. 10) are placed outside the same on the plane on which it is lying, if not on suitable points of the model itself; which fixed points are placed at a distance one from the other, that corresponds to the dimensions of the apparatus. Then the apparatus is placed above the model, after loosening of the set-screws in such manner that the cube may be right above a certain part of it, whereby the nails, $k$. are inserted in the trunnel-pans or heads $y$, where they are kept by spring catches $y^2$, (see Fig. 10.) After having by turning and adjusting the several parts of the apparatus, given the cube the position desired in relation to the model, it is fixed by securing all the screws. Such blocks with trunnels as before described are placed with the same reciprocal distance as the aforementioned, upon or outside the material, marble or the like, out of which the copy is to be formed. The cube as mentioned before, is provided with a great number of holes 1, 2, 3, &c., which are numbered as shown in Fig. 4. The piercers of different fineness as may be desired, that are to be inserted in these holes, also have corresponding numbers, and also adjustable collars, which cannot pass through the holes in the cube. The puncturing now takes place in such manner that a piercer is inserted in the holes of the cube, until the point abuts against the part of the model right beneath the hole. The collar of the piercer is then brought down so far that its lower edge abuts against the upper plane of the cube and is fastened there by means of a set-screw. The other piercers are arranged in the same manner and thus a great many points of the model are obtained at the same time, the distance of which points from a fixed surface, namely the upper plane of the cube, is settled and measured, consisting in the length of the piercer up to the said surface. The apparatus is then transported to the material and the nails $k$ are put down into the trunnelpans, placed upon or outside the same. All the piercers will then abut against the material, whereby the collars are lifted over the upper plane of the cube just as much as corresponds to the difference between the height of the plane of the cube over the point in question on the material, and the height of the same plane over the corresponding point of the model. The piercers are therefore only to be turned around by hand or by machine, and thus brought down into the material until the collar abuts against the upper plane of the cube, when the distance from the bottom of the bored hole to the upper plane, clearly will be equal to the distance between the same plane and the point of the model against which the piercer abutted when the apparatus was placed above the same. All the other piercers are treated in the same way, whereupon the apparatus is removed and the parts of the material between the holes are chiseled away. By replacing the apparatus above the model, and adjusting the cube right over another part of the model, new points can be marked which in the manner above mentioned, can be fixed in the material, &c.

Because a great number of points can be marked at the same time, this apparatus affords considerable advantages compared with any other apparatus of this class, known to me, avoiding much trouble and waste of time, and to an essential degree facilitating its use. The cube-shaped holder also can have a number of holes bored through two opposite vertical sides, in which holes the piercers are to be inserted. It is not necessary that the holder should be cube-shaped, it can for instance have the shape of a thick disk or any shape suitable for receiving the piercers.

Having thus described my invention, what I claim as new, and desire to secure by Letters Patent, is—

An improved apparatus for copying sculptural works by means of puncturing, consisting in a frame composed of a set of rods or tubes laid over and crossing each other and connected with, and movably adjustable relative to, each other, in combination with a holder having many holes to receive and guide the piercers, such holder being jointed to and upheld by some of said rods, substantially as shown and described.

In testimony whereof I have signed my name to this specification in the presence of two subscribing witnesses.

PEHR HASSELBERG.

Witnesses:
TH. WAURINSKY,
CARL CECECU.